(12) United States Patent
Behmaram-Mosavat et al.

(10) Patent No.: US 9,101,833 B2
(45) Date of Patent: Aug. 11, 2015

(54) APPARATUS, METHOD AND COMPUTER READABLE STORAGE MEDIUM FOR GUIDING GAME PLAY VIA A SHOW ME BUTTON

(75) Inventors: Fareed Behmaram-Mosavat, Winchester, MA (US); Seth John Sivak, Cambridge, MA (US); William Lazzaro, Somerville, MA (US)

(73) Assignee: Zynga Inc., San Francisco, CA (US)

( * ) Notice: Subject to any disclaimer, the term of this patent is extended or adjusted under 35 U.S.C. 154(b) by 266 days.

(21) Appl. No.: 13/601,507

(22) Filed: Aug. 31, 2012

(65) Prior Publication Data

US 2013/0059634 A1    Mar. 7, 2013

Related U.S. Application Data

(60) Provisional application No. 61/530,574, filed on Sep. 2, 2011.

(51) Int. Cl.
| | | |
|---|---|---|
| A63F 9/24 | (2006.01) | |
| A63F 13/00 | (2014.01) | |
| G06F 17/00 | (2006.01) | |
| G06F 19/00 | (2011.01) | |
| A63F 13/40 | (2014.01) | |
| A63F 13/30 | (2014.01) | |

(52) U.S. Cl.
CPC ............... *A63F 13/10* (2013.01); *A63F 13/12* (2013.01); *A63F 2300/305* (2013.01); *A63F 2300/308* (2013.01); *A63F 2300/5513* (2013.01); *A63F 2300/807* (2013.01)

(58) Field of Classification Search
USPC .................................. 463/1, 9, 23, 30, 31, 40
See application file for complete search history.

(56) References Cited

U.S. PATENT DOCUMENTS

| | | | |
|---|---|---|---|
| 6,609,976 B1 * | 8/2003 | Yamagishi et al. ............. | 463/31 |
| 2010/0048273 A1 * | 2/2010 | Wallace et al. ................... | 463/7 |
| 2011/0107239 A1 * | 5/2011 | Adoni et al. ................... | 715/757 |
| 2013/0005471 A1 * | 1/2013 | Chung et al. .................... | 463/42 |

* cited by examiner

*Primary Examiner* — Adetokunbo O Torimiro
(74) *Attorney, Agent, or Firm* — Martine Penilla Group, LLP

(57) ABSTRACT

An apparatus, method and computer-readable storage medium for guiding a player to the completion of a task during game play. The player selects a control device in a graphical user interface device generated by a processor. In response to the selection, a hint is provided to the user in the graphical user interface that presents a game board to a player. The player may use the hint to accomplish the task.

23 Claims, 7 Drawing Sheets

APPARATUS, METHOD AND COMPUTER READABLE STORAGE MEDIUM FOR GUIDING GAME PLAY VIA A SHOW ME BUTTON

CROSS REFERENCE TO RELATED APPLICATIONS

This application claims the benefit of U.S. Provisional Patent Application Ser. No. 61/530,574, filed Sep. 2, 2011

FIELD

The presently disclosed embodiments relate to interactive data presentation, for example, during computer game play.

BACKGROUND

Interactive computer games hosted on a computer in which a player interacts with the computer through a graphical user interface are known. The presentation of a game on the computer device may include a graphical user interface that provides a game board in which an avatar, or a character representing a player, performs tasks. As part of the game, the avatar may perform actions similar to a human, such as walking, picking up an object, and traveling through the game board. The avatar may perform these actions in response to inputs to the computer or graphical user interface or both made by a player. Examples of games may include Frontierville from Zynga, the assignee of the present application. During game play, the avatar may have to accomplish a task in order to progress through the game. However, as the game boards become more visually complex, the tasks to be accomplished may become more difficult because the objects required to complete the task may be more difficult to find in the complex board. As a result, the steps to complete the task may be more difficult for a player and, if the task is too difficult, the player may lose interest. This may be especially true when a player is attempting to complete the task for a first time.

Therefore, it is desirable to allow a player to request assistance to accomplish a task during a game. The inventor has recognized a solution to assist a player in the accomplishment of a task.

DETAILED DESCRIPTION

Embodiments may be discussed herein that provide guidance to a player during game play that facilitates the player's accomplishment of a task. In an embodiment, an apparatus may be provided for guiding a player in the accomplishment of a task in an electronic game. The apparatus may include a graphical user interface to receive and respond to player inputs and present data to the player; a display device to present a graphical user interface; and a processor that executes computer instructions for responding player inputs and manipulating the presentation of data in the graphical user interface and causing the presentation of the data on the display device. The processor may be configured to present a game board in the graphical user interface on the display device. The game board may include an avatar, regions and objects within the regions. The avatar may move within the regions and interacts with the objects. The processor may also generate a task to be accomplished by a player via inputs to the graphical user interface. The inputs may control the actions of an avatar. The task may be presented in a task list in the graphical user interface. In response to an input selecting the task, a task menu containing a sub-task icon that illustrates a sub-task to be accomplished by the avatar may be presented in the graphical user interface. A show-me control button may be presented adjacent to the sub-task icon. The show-me control button when selected may provide a hint to the player on how to accomplish the sub-task by changing the presentation of the graphical user interface.

Another embodiment provides a method for guiding a player in the accomplishment of a task in an electronic game. A game board may be presented in the graphical user interface on a display device. The game board may include an avatar, regions and objects within the regions, wherein the avatar moves within the regions and interacts with the objects. A task to be accomplished by a player via inputs to the graphical user interface may be generated. The inputs to the graphical user interface may control the actions of the avatar. The task may be presented in a task list in the graphical user interface. In response to an input selecting the task, a task menu containing a sub-task icon that illustrates a sub-task to be accomplished by the avatar. A show-me control button may be presented adjacent to the sub-task icon. When selected, the show-me control button may provide a hint to the player on how to accomplish the sub-task by changing the presentation of the graphical user interface.

Another embodiment provides a computer readable medium containing computer readable program instructions that when executed by a processor performs the previously described method for guiding a player in the accomplishment of a task in an electronic game.

Figure 1:
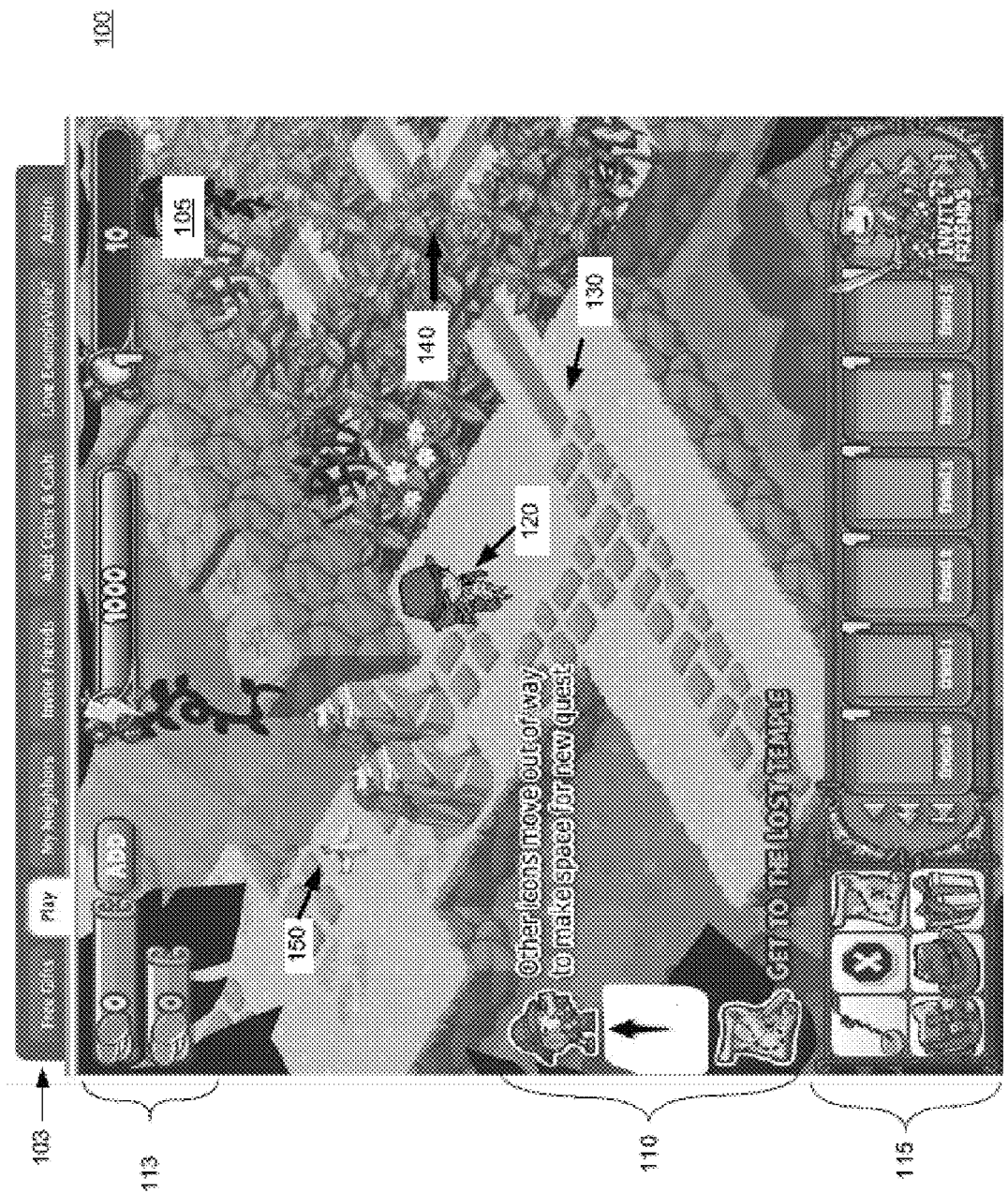
FIG. 1 is an exemplary view of a graphical user interface according to an embodiment of the present invention.

FIG. 1 illustrates an exemplary view of a graphical user interface according to an embodiment of the present invention. The graphical user interface (GUI) 100 may be presented on a display device, e.g., computer monitor, tablet computer, television. The graphical user interface 100 may present a game board 105 that is an environment with which an avatar 120 interacts. For example, FIG. 1 shows an archeologically-themed game board environment. Other themes, such as the "wild west", underwater, extraterrestrial, frontier, fantasy-oriented themed game board environments may also be used. In addition, the GUI 100 may include tags 103 for navigating between The avatar 120 may be a character representation of a player, and may respond to inputs to the GUI 100. The game board 105 may include indicators, such as a task list 110, tool kits 115, game progress indicators 113. No matter the theme of the game board, the game boards, including game board 105, may have in addition to an avatar 120, paths 130 for traveling around the game board 105, and objects 140 and 150. The objects 140 and 150 may be obstacles, such as bushes, or traps, such as a banana peel that may cause the avatar 120 to slip. The obstacle objects 140 may be removed by player commanding the avatar 120 to perform some action, and the trap objects 150 may either be avoided or rendered ineffective by player commanding the avatar 120. For example, the player may select a tool from the tool kit 115, and the avatar 120, in response to player inputs to the GUI 100, may clear the bushes (obstacle object 140) that block the path 130. Alternatively, the player can select another tool from the tool kit 115 and pick up the banana peel (trap obstacle 150). The task list 110 may present a number of tasks that are to be performed by the player via the avatar 120 during game play. Some of the tasks in the task list 110, e.g., get to the lost temple, may be easily accomplished by the player, while others may be more challenging.

To assist a player in performing a task from the task list 110, the GUI 100 may provide textual instructions, but may also provide a visual clue. To obtain the instructions, a player may select a particular task in the task list 110. The selection of the task from the task list 110 may cause a processor executing the game instructions to generate another task GUI that may be task overview window displayed over the game board 105. The task overview window will be described in more detail with respect to FIG. 2.

Figure 2:
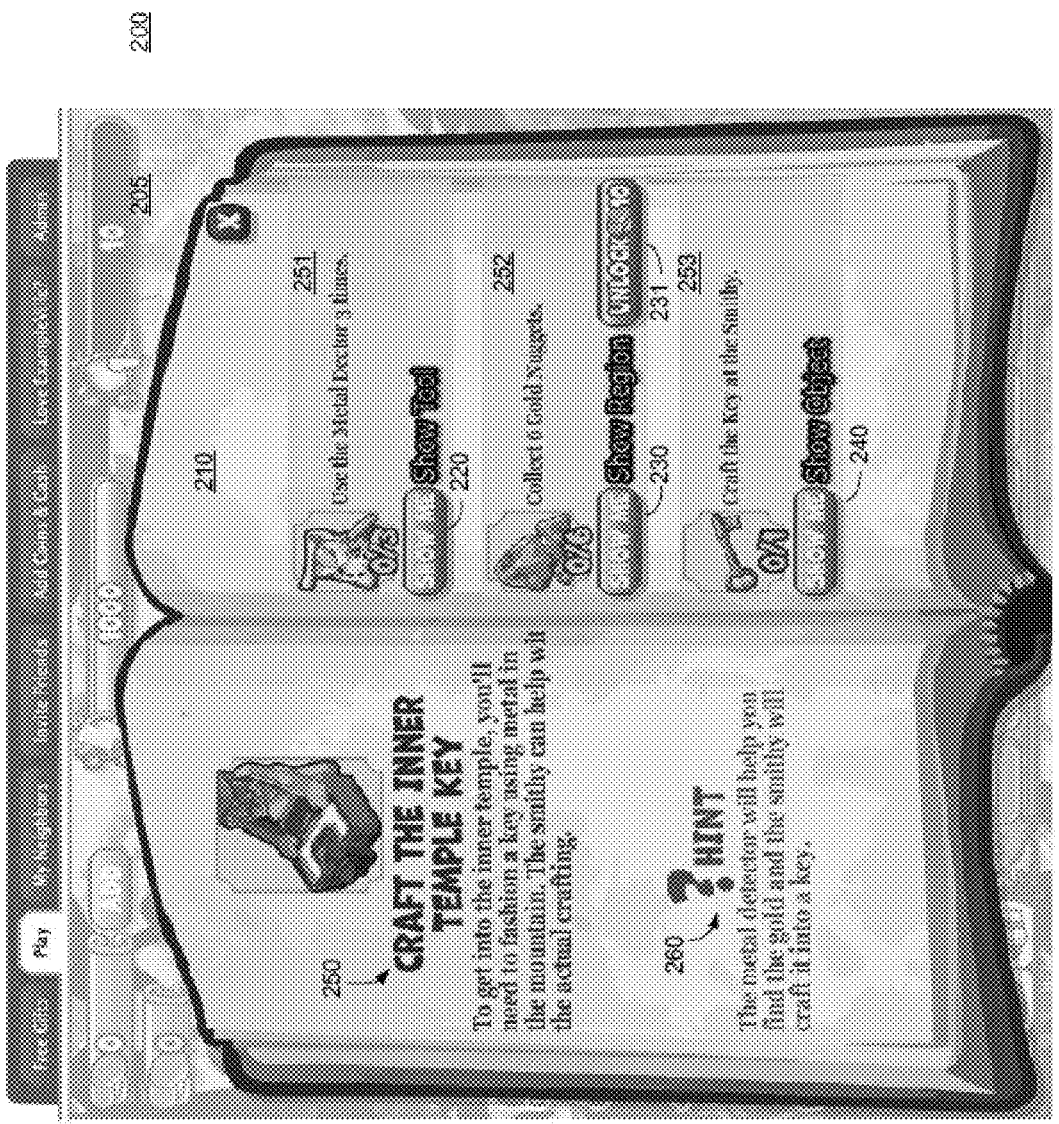
FIG. 2 illustrates another graphical user interface that presents a graphical user interface presenting a task overview according to an embodiment of the present invention.

FIG. 2 illustrates another graphical user interface that presents a graphical user interface presenting a task overview. The task 250 is an exemplary task and is not intended to limit the scope of the disclosed embodiment. The task overview GUI 210 may be presented over the game board 205, and may be a GUI within the game GUI 200. The task overview GUI 210 may include an overview of the task 250 as a textual description, or a graphical description, or both. The task overview may explain to the player the goal of the task 250. The task overview GUI 210 may also include a hint 260 to the player on how to accomplish the task 250. The task 250 may have sub-tasks, such as sub-tasks 251, 252, and 252. Sub-task 251 may require the use of a tool that the player's avatar 120 may obtain, for example, from the tool kit 115 of FIG. 1. While the sub-task 252 may require a player's avatar 120 (of FIG. 1) to interact with certain objects from the game board 205. In the example, the player's avatar is tasked with collecting 6 gold nuggets. The sub-task 252 could also have been to clear the bushes from the path, find the ruins, put a banana peel in the trash, and the like. Sub-task 253 is yet another action "craft the Key at the Smithy" to be performed by the player's avatar.

The sub-tasks 251-253 may include an additional control devices 220, 230, 240 in the GUI 210 that may be selected by the player. The addition control devices 220, 230, 240, when selected may provide further hints related to completing the specific subtask. In sub-tasks 251-253, the control devices 220, 230, 240 are illustrated as rectangular buttons with the words "Show me" on them. The control devices 220, 230, 240 may be any shape and may be located at any location within the task overview GUI 210.

In addition, the control devices 220, 230,240 are directed to providing hints for different aspects of the games. For example, the control device 220, when selected, may provide hints about how to use a particular tool object, specifically, a metal detector tool. The control device 230, when selected, may provide a hint of a region of a game board that an object, in this case, the gold nuggets, can be found. Meanwhile, the control device 240, also when selected, may provide a hint about a particular object on the game board. For example, the control device 240 may show the "Smithy" object, so the key may be crafted. In addition, each of, or certain ones of, the control devices 220-240 may be locked, and may only be unlocked after the player or the player's avatar performs some action, for example, purchase access using fake game money, purchase access using real currency, earn access as a reward, or be given access as a gift by other players of the interactive game. The control device 231 indicates that control device 230 is "locked," and can be unlocked with payment of 10 coins. Although shown as a rectangular block, control device 231 may be any shape and may be any location in the task overview GUI 210 so long as there is some indication to the player that the unlock control device 231 is associated with a specific sub-task, in this case, sub-task 230.

Hints via the show-me button may be available to the player for showing hints related to a particular tool, a particular region of the game board related to the task, and a particular object in the game board related to the task. In response to the selection of any of the "show-me" buttons, the task overview GUI 210 will be taken down, and the player will be presented with a GUI containing a game board and a visual hint related to the specific sub-task. The system/processor response to the selection of the show me button will be described in more detail with reference to FIG. 3

Figure 3:
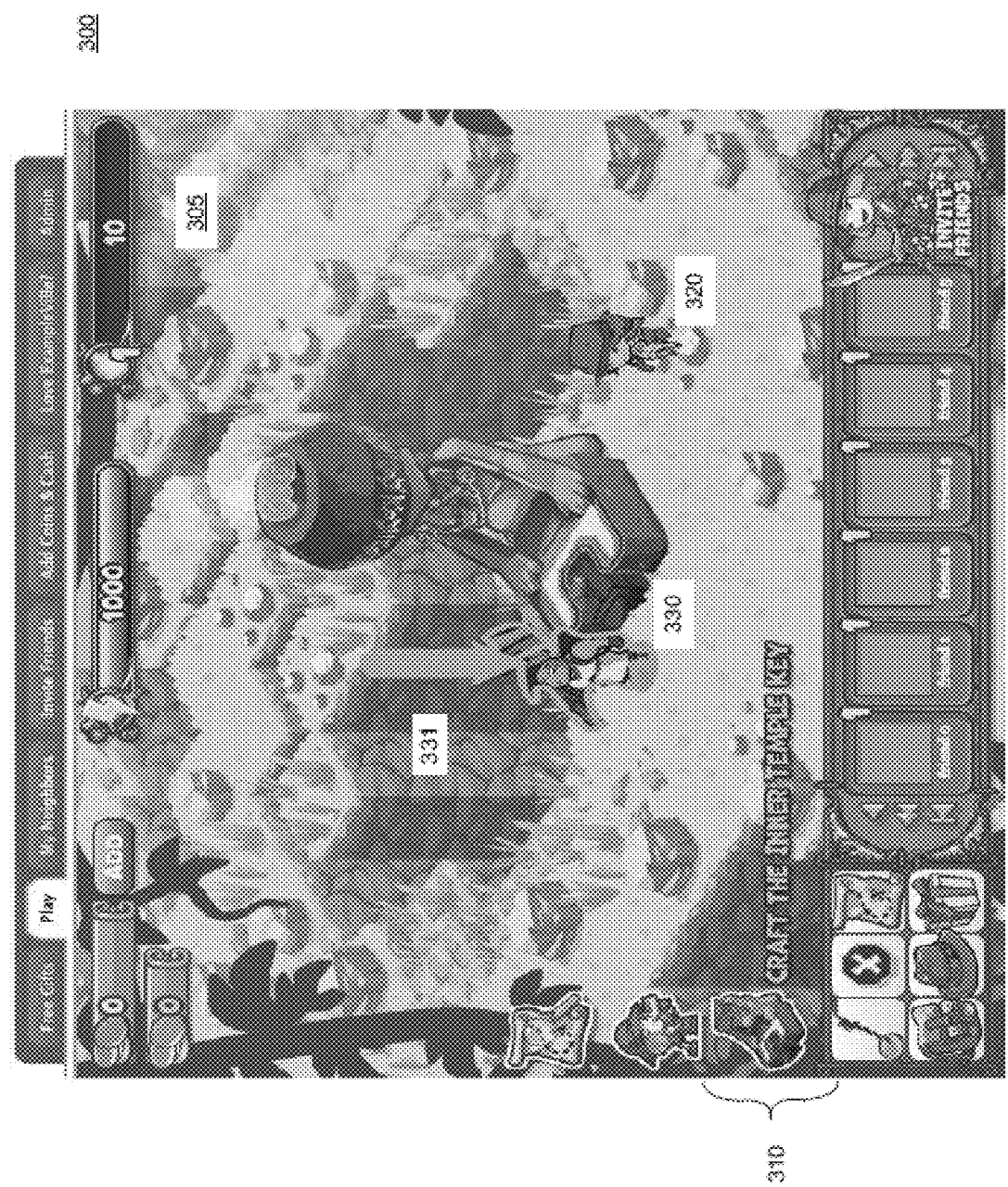
FIG. 3 illustrates an exemplary illustration of the show object hints according to an embodiment of the present invention.

FIG. 3 illustrates an exemplary illustration of the show object hints according to an embodiment of the present invention. If a player selects the show me button 230 in the sub-task 252, the task overview GUI 210 is taken down (i.e., no longer presented in the GUI 200). The show me button 230 is associated with showing an object related to the sub-task 252. Once the task overview GUI is completely taken done, the GUI 300 presents a game board 305 to the player. Recall in FIG. 1 that the view presented to the player was the player's avatar's 120 location within the game board 105. In FIG. 3, as a result of the selection of the object "show me" button in the sub task 251 of FIG. 2, the camera view of the game board 305 may have panned to and centered on the location in the game board where actions for the selected sub-task may be performed. The avatar 320 may or may not be placed in the location. FIG. 3 shows the avatar 320 in the object's location on the game board. The location of the object is centered. The GUI 300 presents the task list 310 as well as the object 330, in this example, "Smithy," and an indicator 331. The object 330 may be highlighted in a color that contrasts with the colors of the game board 305. The indicator 331, in this case, an arrow, may also be shown in the same highlighted color as the object 330. The indicator 331 may also have some animation associated with it, such as flashing or oscillations, to insure that the player sees the object. The indicators 331 and highlighting of the object may remain until the user takes action on that object 330 or another show me is done.

Figure 4:
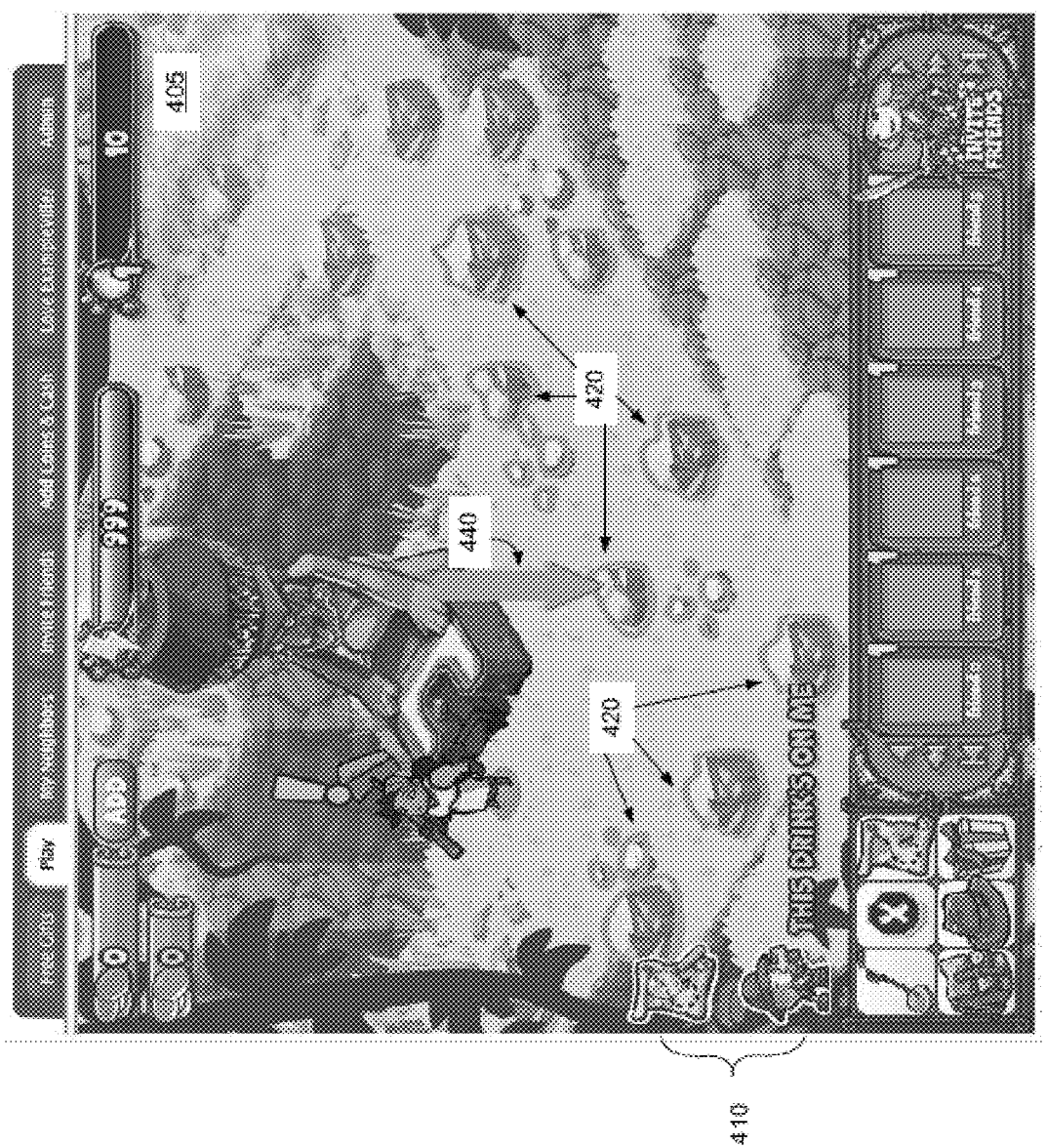
FIG. 4 illustrates an exemplary illustration of the show region hints according to an embodiment of the present invention.

FIG. 4 illustrates an exemplary illustration of the show region hints according to an embodiment of the present invention. The selection of show me button 240 in the sub-task 253 may cause the task overview GUI 210 to be taken down (i.e., no longer presented in the GUI 200). The show me button 240 is associated with showing a region related to the sub-task 253. Once the task overview GUI 210 is taken down, GUI 400 is presented to the player. The GUI 400 may include the task list 410 and the game board 405. The game board 405 is shown in the GUI 400 with regions 420 related to completing the sub-task 253 highlighted. In response to selection of the show me button 240, the camera view of the game board 405 may pan/zoom from the previously shown game board location to the new location shown in the game board 405. Alternatively, if the region 420 happens to be related to a previously selected show me button, the camera view may not change. The regions related to the sub-task 253 in the example may be rocks 420 in the game board 405. The avatar (not shown) may take action with respect to the regions 420. An indicator 440 may be presented to insure that a player sees the highlighted regions 420. The indicator 440 may also have some animation associated with it, such as flashing or oscillations, to insure that the player sees the object. The indicator 440 and highlighting of the regions 420 may remain until the user takes action on that object or another show me is done.

Figure 5:
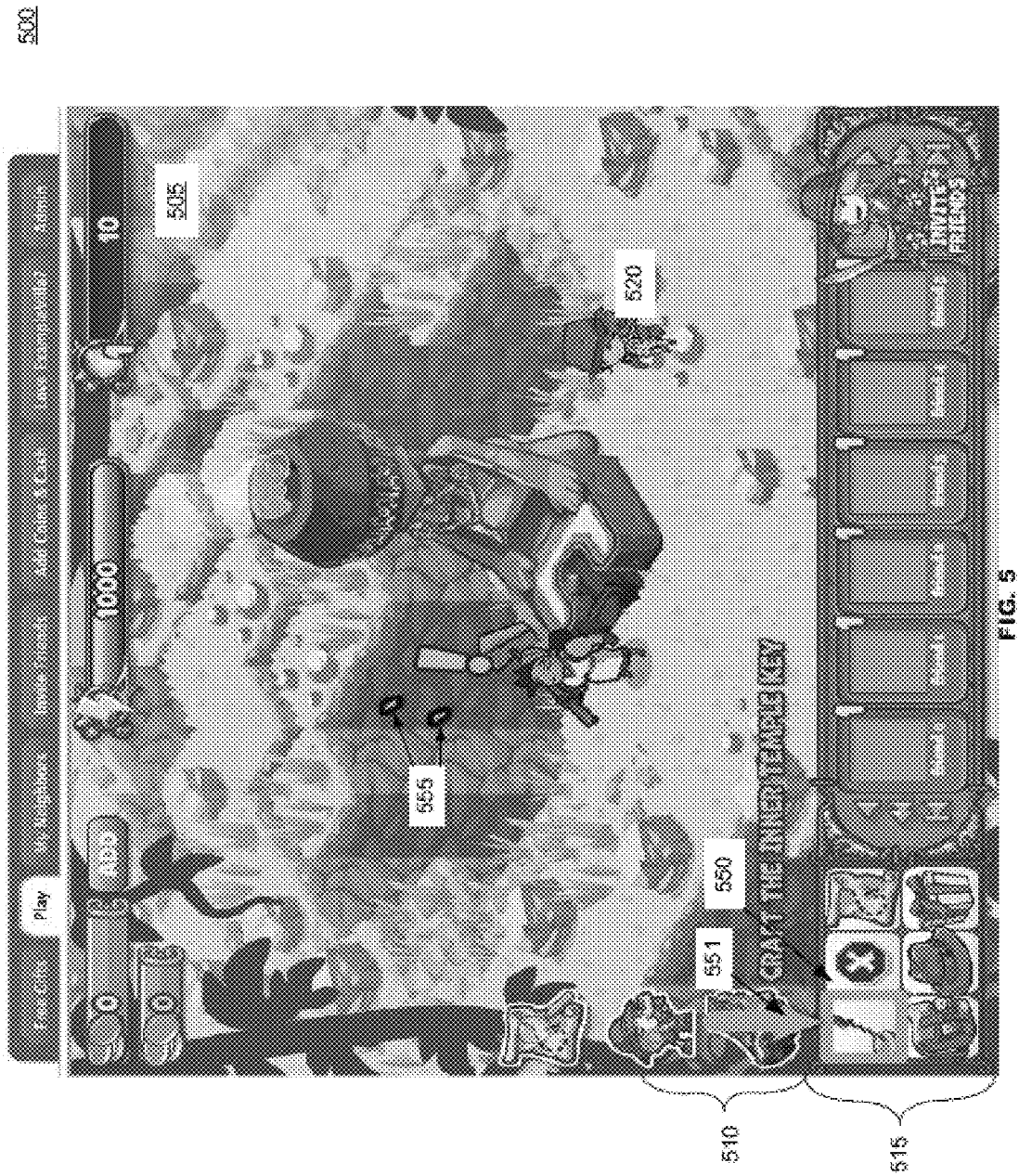
FIG. 5 illustrates an exemplary illustration of the show tool hints according to an embodiment of the present invention.

FIG. 5 illustrates an exemplary illustration of the show tool hints according to an embodiment of the present invention. The selection of show me button 220 in the sub-task 251 may cause the task overview GUI 210 to be taken down. The show me button 220 is associated with showing a tool related to the sub-task 251. Once the task overview GUI 210 is taken down, GUI 500 is presented to the player. The GUI 500 may include the task list 510 and the game board 505. The game board 505 may be shown in the GUI 500 with a tool 550 related to completing the sub-task 251 highlighted. In response to selection of the show me button 220, the camera view of the game board 505 may pan/zoom from the previously shown game board location to the new location shown in the game board 505. Alternatively, if the tool 550 happens to be related to a previously selected show me button, the camera view may not change, or change only slightly. The tool 550 related to the sub-task 251 in the present example may be the metal detector shown in tool kit 515 at the bottom of the game board 505. The avatar 520 may use the tool 550. An indicator 551 may be presented to insure that a player sees the highlighted tool 550. The indicator 551 may also have some animation associated with it, such as flashing or oscillations, to insure that the player sees the object. In addition to the highlighted tool 550, the game board 505 may show highlighted objects 555 that may be worked on by an avatar 520 using the tool 550. In the present example, the highlighted objects 555 are shown beneath the ground and not readily visible on the game board 505. Therefore, it would be easier to find the objects 555 using the metal detector tool 550. The indicator 551, highlighting tool 550 and highlighted objects 555 may remain until the user takes action on that object or another show me is done.

Figure 6:
FIG. 6 illustrates an exemplary illustration of after the show tool hint is used according to an embodiment of the present invention.

FIG. 6 illustrates an exemplary illustration of after the show tool hint is used according to an embodiment of the present invention. The GUI 600 may include the game board 605 and a tool locker 610 that is associated with a tool from the tool kit 615. In this example, the metal detector is the tool. The tool locker 610 may be used to store objects such as the objects 555 that were previously at the game board region 655. An indicator 661 may be presented to insure that a player sees the highlighted location 660 in the tool locker 610. The indicator 551 may also have some animation associated with it, such as flashing or oscillations, to insure that the player sees the object. The indicator 660 may The avatar 620 may also be present.

Figure 7:
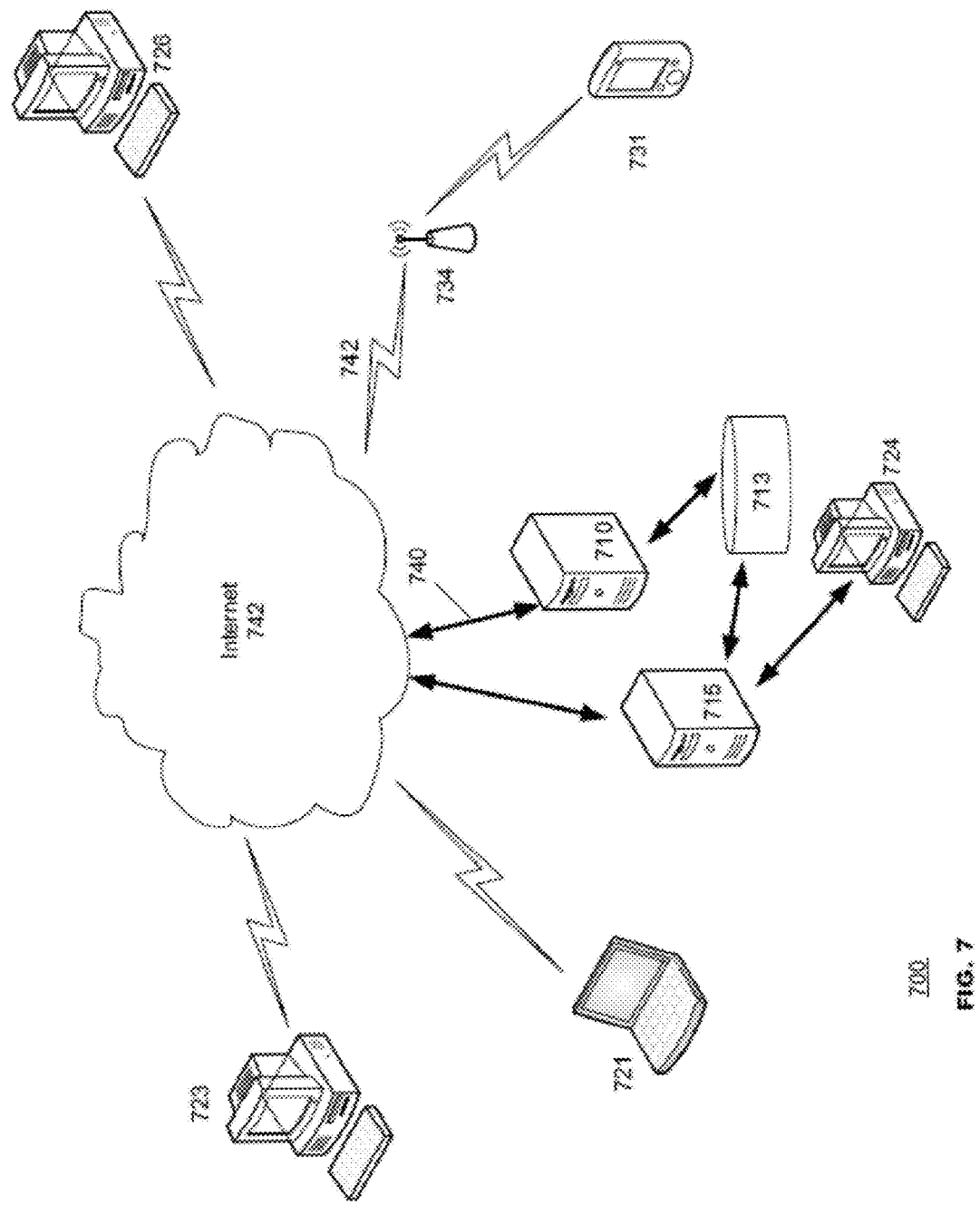
FIG. 7 illustrates a system for implementing a method according to an embodiment of the present invention.

FIG. 7 illustrates an exemplary hardware configuration for implementing a system according to an embodiment of the present invention. The system 700 may comprise one or more networked servers 710 and 715, one or more player computers 721, 723, 724 and 726, data storage devices 713, wired and wireless communication links 740, 742, wireless access point 734, and a portable device(s) 731. The one or more networked servers 710 and 715 may execute a multi-application software system that may include a web server, gaming software applications and social networking applications. The servers 710, 715 may include processor(s), internal memory and related computer program instructions (all not shown). The player computers 721, 723, 724 and 726 may include a processor, display device, and data storage device, such as a hard disk (all not shown).

The server 710 and/or 715 may provide connectivity between the players' computers 721, 723, 724 and 726, and/or players' portable device(s) 731 over wired or wireless communication paths. The server 710 may access data storage device(s) 713 that store machine-readable software instructions for executing the described method may be accessed and executed by the processor(s) of the server 710. The instructions for generating and presenting may be downloaded to players' computers 721, 723, 724 and 726, and/or players' portable device(s) 731 over wired or wireless communication paths. The game software may execute on the processors in the players' computers 721, 723, 724 and 726, and/or players' portable device(s) 731.

The data storage device(s) 713 also may store data related to the players for future use. The data storage device 713 that may be a hard disk drive, non-volatile memory, flash memory, or any suitable device for storing electronic data, and may be organized as a object-oriented or relational database.

The servers 710 and 715 may communicate with client terminal(s) 721, 723, 724, 726 and portable device(s) 731 via the internet 742. The player computers 721, 723, 724, 726 may include a processor, display device, and data storage device, such as a hard disk (all not shown). The client terminals 721, 723, 724, 726 may participate in execution of program instructions. The portable device 731 may be a smartphone, personal digital assistant, tablet, notebook or mini-notebook computer capable of wired and/or wireless communication. The portable device 731 may include memory, a processor, input device, display, and devices that enable wired or wireless communication.

Several embodiments of the present invention are specifically illustrated and described herein. Those skilled in the art may appreciate from the foregoing description that the present invention may be implemented in a variety of forms, and that the various embodiments may be implemented alone or in combination. In other instances, well-known operations, components and circuits have not been described in detail so as not to obscure the embodiments. It can be appreciated that the specific structural and functional details disclosed herein may be representative and do not necessarily limit the scope of the embodiments. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disc Read Only Memory (CD-ROM), Compact Disc Recordable (CD-R), Compact Disc Rewriteable (CD-RW), optical disk, magnetic media, magneto-optical media, removable memory cards or disks, various types of Digital Versatile Disc (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An apparatus for guiding a player in an accomplishment of a task in an electronic game comprising:
  a graphical user interface to receive and respond to player inputs and present data to the player on a display device; and
  a processor that executes computer instructions for responding to player inputs and manipulating a presentation of data in the graphical user interface and causing the presentation of the data on the display device, the processor configured to:
    present a game board included in the data, the game board being presented in the graphical user interface on the display device, the game board including an avatar, a plurality of regions and at least one of a plurality of objects within at least one of the plurality of regions, wherein the avatar is movable within the plurality of regions and is capable of interacting with at least one of the plurality of objects;
    receive an input from the graphical user interface corresponding to an action of the avatar including generating a task to be accomplished by a player;
    present the task in a task list in the graphical user interface;
    receive a selection of the task including presenting a task menu containing a sub-task icon that corresponds to a sub-task to be accomplished by the avatar, the task menu being presented as superimposed over at least one of the plurality of regions of the game board;
    present a show-me control button adjacent to the sub-task icon; and
    receive a selection of the show-me control button including:
      displaying a hint in at least one of the plurality of regions of the game board, the hint includes an instruction how to accomplish the sub-task corresponding to the sub-task icon; and
      providing an indication in the game board, the indication indicating a displayed object corresponding to the sub-task icon, the displayed object being displayed in at least one of the plurality of regions of the game board being presented in the graphical user interface.

2. The apparatus of claim 1, wherein the indication provided in the graphical user interface is an arrow-shaped indicator over the displayed object.

3. The apparatus of claim 2, wherein the processor is further configured to oscillate the indicator in a vertical direction over the displayed object.

4. The apparatus of claim 1, wherein the indication provided in the graphical user interface is a high contrast outlining of a representative set of displayed objects.

5. The apparatus of claim 1, the processor further configured to:
  present adjacent to the show-me control button a buy button that indicates that access to the show-me button must be purchased, wherein currency or game tokens are used to purchase the access to the show-me button.

6. The apparatus of claim 1, the processor further configured to:
  generate a pop-up window for presenting an online store for purchasing the access to the show-me button.

7. The apparatus of claim 1, the processor further configured to:
  generate a full window for presenting a graphical user interface that presents the object on the current page and an indicator directed at the object.

8. The apparatus of claim 1, the processor further configured to:
  replace the show-me control button with a buy button that indicates that access to the show-me button must be purchased, wherein currency or game tokens are used to purchase the access to the show-me button.

9. A method for guiding a player in an accomplishment of a task in an electronic game comprising:
  presenting a game board in a graphical user interface on a display device, the game board including an avatar, a plurality of regions and a plurality of objects within the plurality of regions, wherein the avatar moves within the plurality of regions and interacts with at least one of the plurality of objects;
  receiving an input from the graphical user interface corresponding to an action of the avatar including generating a task to be accomplished by a player;
  presenting the task in a task list in the graphical user interface;
  receiving a selection of the task including presenting a task menu containing a sub-task icon that corresponds to a sub-task to be accomplished by the avatar, the task menu being presented as superimposed over at least one of the plurality of regions of the game board;
  presenting a show-me control button adjacent to the sub-task icon; and
  receiving a selection of the show-me control button including:
    displaying a hint in at least one of the plurality of regions of the game board, the hint includes an instruction how to accomplish the sub-task corresponding to the sub-task icon; and
    providing an indication in the game board the indication indicating a displayed object corresponding to the sub-task icon, the displayed object being displayed in at least one of the plurality of regions of the game board being presented in the graphical user interface wherein the indication oscillates over the displayed object.

10. The method of claim 9, wherein the indication provided in the graphical user interface is an arrow-shaped indicator over the displayed object.

11. The method of claim 10, further comprising:
oscillating the indication in a vertical direction over the displayed object.

12. The method of claim 9, wherein the indication provided in the graphical user interface is a high contrast outlining of a representative set of displayed objects.

13. The method of claim 9, further comprising:
presenting adjacent to the show-me control button a buy button that indicates that access to the show-me button must be purchased, wherein currency or game tokens are used to purchase the access to the show-me button.

14. The method of claim 9, further comprising:
generating a pop-up window for presenting an online store for purchasing the access to the show-me button.

15. The method of claim 9, further comprising:
generating a full window for presenting a graphical user interface that presents the object on the current page and an indicator directed at the object.

16. The method of claim 9, the processor further configured to:
replacing the show-me control button with a buy button that indicates that access to the show-me button must be purchased, wherein currency or game tokens are used to purchase the access to the show-me button.

17. A non-transitory computer-readable storage medium embodied with program instructions for causing a processor to execute a method for guiding a player in an accomplishment of a task in an electronic game, the executed method comprising:
presenting a game board in a graphical user interface on a display device, the game board including an avatar, a plurality of regions and a plurality of objects within the plurality of regions, wherein the avatar moves within the plurality of regions and interacts with at least one of the plurality of objects;
receiving an input from the graphical user interface corresponding to an action of the avatar including generating a task to be accomplished by a player;
presenting the task in a task list in the graphical user interface;
receiving a selection of the task including presenting a task menu containing a sub-task icon that corresponds to a sub-task to be accomplished by the avatar, the task menu being presented as superimposed over at least one of the plurality of regions of the game board;
presenting a show-me control button adjacent to the sub-task icon; and,
receiving a selection of the show-me control button including:
displaying a hint in at least one of the plurality of regions of the game board, the hint includes an instruction how to accomplish the sub-task corresponding to the sub-task icon; and
providing an indication in the game board, the indication indicating a displayed object corresponding to the sub-task icon, the displayed object being displayed in at least one of the plurality of regions of the game board being presented in the graphical user interface wherein the indication provided in the graphical user interface is a high contrast outlining of a representative set of displayed objects.

18. The non-transitory computer-readable storage medium of claim 17, wherein the indication provided in the graphical user interface is an arrow-shaped indicator over the displayed object.

19. The non-transitory computer-readable storage medium of claim 18, further comprising:
oscillating the indicator indication in a vertical direction over the displayed object.

20. The non-transitory computer-readable storage medium of claim 17, further comprising:
presenting adjacent to the show-me control button a buy button that indicates that access to the show-me button must be purchased, wherein currency or game tokens are used to purchase the access to the show-me button.

21. The non-transitory computer-readable storage medium of claim 17, wherein the indication provided in the graphical user interface is an arrow-shaped indicator over the displayed object.

22. The non-transitory computer-readable storage medium of claim 17, further comprising:
oscillating the indicator indication in a vertical direction over the displayed object.

23. The non-transitory computer-readable storage medium of claim 17, the processor further configured to:
replacing the show-me control button with a buy button that indicates that access to the show-me button must be purchased, wherein currency or game tokens are used to purchase the access to the show-me button.

* * * * *